March 25, 1947.      T. C. HARPER      2,417,930
ICE REMOVING DEVICE FOR AIRPLANES
Filed June 13, 1942      2 Sheets-Sheet 2

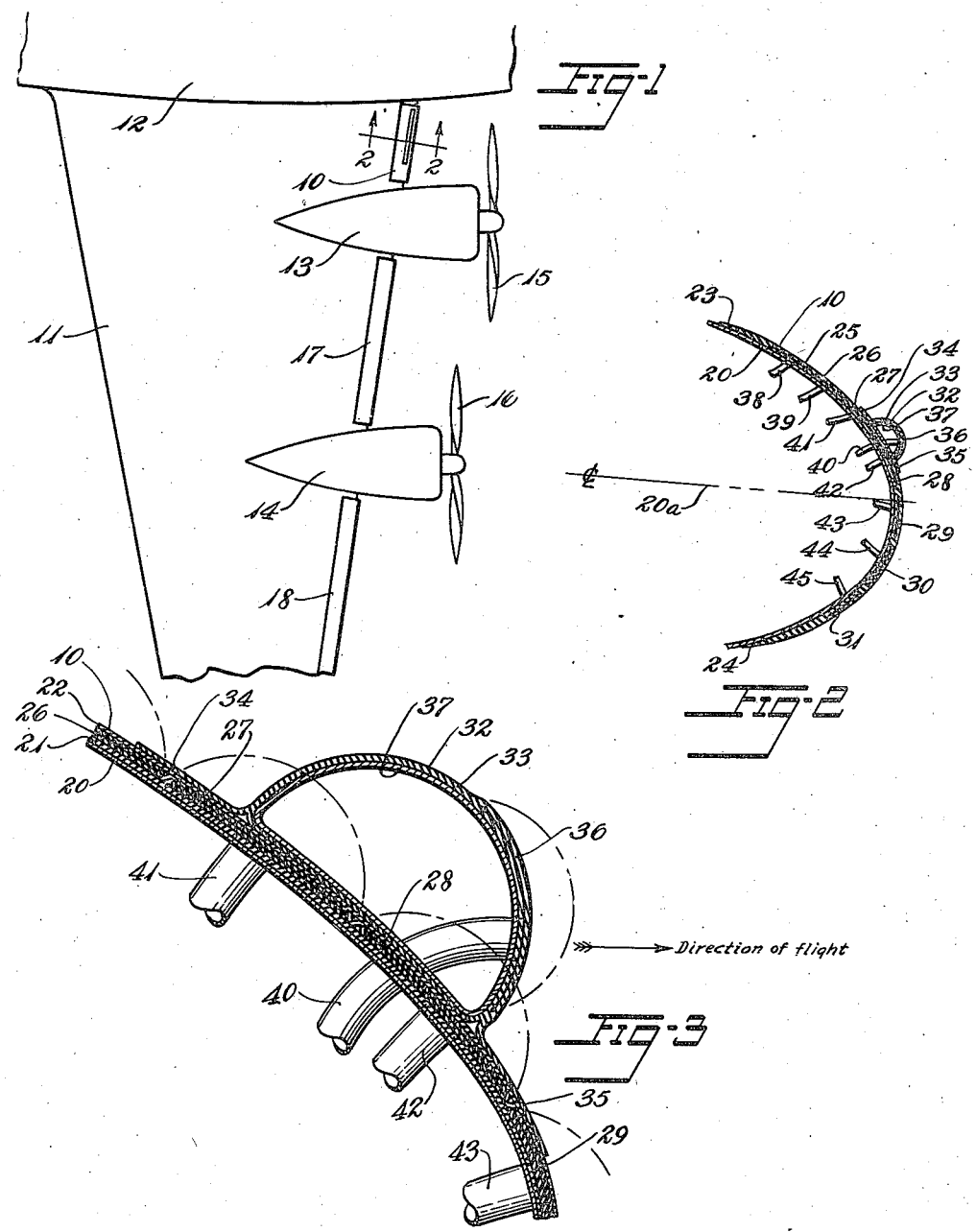

Inventor
Thomas C. Harper
By Willis F. Avery
Atty.

Patented Mar. 25, 1947

2,417,930

UNITED STATES PATENT OFFICE 2,417,930

ICE REMOVING DEVICE FOR AIRPLANES

Thomas C. Harper, Akron, Ohio, assignor to The B. F. Goodrich Company, New York, N. Y., a corporation of New York Application June 13, 1942, Serial No. 446,879

16 Claims. (Cl. 244—134)

This invention relates to the protection of aircraft from the standpoint of preventing the accumulation of ice upon surfaces thereof and the standpoint of modifying the exposed surfaces as in the case where it is desirable to alter the aerodynamic characteristics of an airfoil.

Objects of my invention are to provide for protecting the exposed surface of a body from the accumulation of ice and at the same time to provide for modifying the contour of the exposed surface of the body in a desired manner.

Further objects of the invention are to provide for preventing the accumulation of ice upon the leading edge of an airfoil and to provide for altering the aerodynamic characteristics of the airfoil in a manner to provide simplicity of construction and effectiveness of operation.

A specific object of the invention is to provide for a shoe structure which is adapted to be mounted at the leading edge of an airfoil and which provides for permanent means for changing the aerodynamic characteristics of the airfoil.

These and other objects and advantages of the invention will be apparent from the following description.

In the accompanying drawing, which forms a part of this specification, and in which like numerals are employed to designate like parts throughout the same, Fig. 1 is a plan view of part of an airplane wing and fuselage showing the wing equipped with a protective covering constructed in accordance with and embodying the invention.

Fig. 2 is a view in section taken along line 2—2 of Fig. 1.

Fig. 3 is an enlarged fragmentary view in section of Fig. 2, showing a permanently protuberant element encased in a shoe structure.

Figure 4:
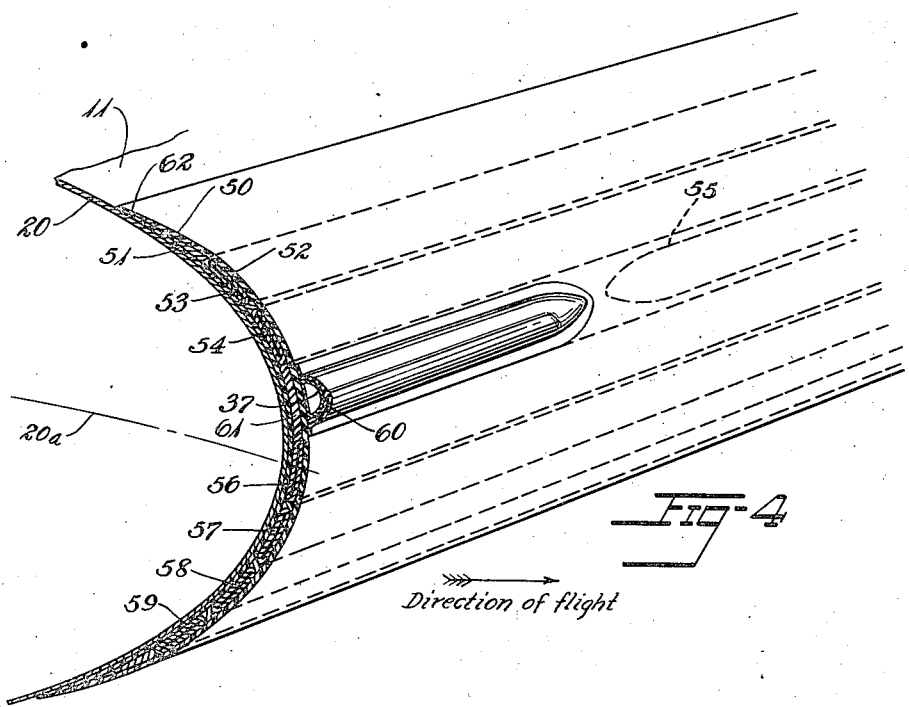
Figs. 4 and 5 are views like Fig. 3, showing, respectively, modified constructions of the invention.

To the end of providing means for preventing the accumulation of ice upon an airfoil and providing means for changing the aerodynamic characteristics of the airfoil, the invention provides for a protective covering 10 or shoe structure, which may be mounted in a manner like that shown in Fig. 1 but which may be disposed at any desired longitudinal location along the leading edge of the wing or other airfoil. For illustrative purposes the protective covering 10 is applied in Fig. 1 to the leading edge of a starboard wing 11 of a multi-engined airplane, other parts of which are shown by a portion of a fuselage 12 and engine nacelles 13 and 14 having tractor propellers 15 and 16. The wing 11 may be provided with inflatable shoes 17 and 18 for preventing ice accumulation upon those portions of the leading edge not equipped with the protective covering 10.

As shown in Figs. 1 to 3 the protective covering 10 is attached at the leading edge of the wing 11 between the engine nacelle 13 and the fuselage 12, and is secured to a wing surface or skin 20. In the illustrated construction a foundation layer 21 of flexible material, such as rubber, and a covering layer 22 of rubber-like material cover the leading edge of the wing 11 or airfoil and have their upper 23 and lower 24 margins secured to the skin 20 by screws or other suitable fastening means, and preferably in a condition of tension between these margins. A plurality of inflatable tubes 25 to 31 are secured between the foundation layer 21 and the cover 22 and are adapted to be inflated in alternation so as to change the contour of the cover and thereby to loosen or break up ice formed thereon for its removal. Preferably the layers 21 and 22 and the inflatable tubes 25 to 31 of the protective covering 10 are united as a unit by vulcanization.

A permanently protuberant element 32 or stiffening reinforcement such as a hollow metal tube 37, which may be semi-circular in section, is superimposed upon the cover 22 and straddles the inflatable tubes 27 and 28, and is encased in a covering 33 of rubber-like material, the covering 33 being secured to the covering layer 22 by means of side portions 34 and 35 adhered to the underlying structure. An inflatable tube 36 may be provided within the covering 33 and may be disposed adjacent the curved portion of the metal tube 37 which is nearest to the chord center line of the wing 11. The tube 36 is adapted to be inflated and to coact with the tubes 27 and 28 in breaking up the ice, which may form upon the cover 33 of the protuberant element 32, providing for the removal of the ice therefrom. For effectively altering the aerodynamic characteristics of the desired portion of the wing 11 it is desirable that the permanently protuberant element 32 be mounted at the center line 20a of the leading edge of the airfoil or wing, either on such line or near it, and preferably above it in the region of negative pressure. Fluid conduits 38 to 45 in communication with the inflatable tubes 25 to 31 and 36 interconnect the latter with a source of fluid and with control means providing for the successive or alternate inflation and deflation of these tubes.

By way of example in the operation of the protective covering 10 or shoe structure, as shown in Figs. 1 to 3, the tube 36 adjacent the exterior surface of the permanently protuberant element 32 or metal tube 37 may be inflated simultaneously with the alternate tubes 26, 28 and 30 of the main structure, while the remaining tubes 25, 27, 29, and 31 are in a deflated condition; and conversely the latter tubes may be then inflated, while the tubes 26, 28, 30 and 36 are in a state of deflation. In this manner a definite rocking movement may be imparted to the element 32 or metal tube 37 by the alternate inflation of the tubes 28 and 27, such movement being coincident with the flexing and stretching of the coverings 22 and 33, thereby effective loosening and breaking up ice accumulation upon the exterior surfaces of the shoe structure 10 including the protuberant element 32. If desired, however, other sequences of inflating the several tubes may be used.

In Fig. 4 a shoe structure 50 is like the shoe structure 10 shown in Fig. 2 in that it is equipped with an equivalent and corresponding number of inflatable tubes 53 to 60, but differs constructionally and functionally in several respects.

In Fig. 4, the metal tube 37 is disposed intermediate the two spaced-apart inflatable tubes 54 and 56 and is mounted upon a suitable rubber filler element 61. Since the tube 37 may extend longitudinally along the leading edge of the wing 11 only a portion of the length of the shoe 50, it is desirable that the remaining extent of the shoe be equipped with an inflatable tube 55 similar to the tubes 53 and 54 except for its shorter length. The shoe 50 which covers the leading edge of the wing 11, is provided with a foundation layer 51 of flexible material, such as rubber, and a covering layer 52 of rubber-like material, which is superimposed upon the inflatable tubes 53 to 60 and the metal tube 37. These two layers 51 and 52 have their upper 62 and lower margins secured to the wing surface 20 and preferably in a state of tension between the margins. The inflatable tube 60 on the metal tube 37 assists in providing for the removal of ice accumulation upon metal tube 37 portion of the shoe 50.

As an illustrative though not limiting example of the operation of the shoe structure 50, the tube 60 may be inflated simultaneously with the alternate tubes 53, 55, 57 and 59, while the remaining tubes 54, 56 and 58 are in a deflated condition. The latter tubes may be inflated next in a similar manner, while the other tubes 53, 55, 57, 59, and 60 are in the deflated state. The dual inflation of the spaced-apart tubes 54 and 56 moves the metal tube 37 outwardly from the wing surface 20 in addition to stretching the cover 52 thereover.

This sequence of tube inflation is desirable to provide for the inflation of the tube 60 and to provide for the aforesaid movement of the metal tube 37 coincidental with the flexing and stretching of the cover 52, thereby effectively preventing the accumulation of ice upon the shoe structure 50 by loosening and breaking up the ice for its removal by the air stream. Thus the shoe structure 50 provides means for removing ice accumulation upon the leading edge of the airfoil together with means for permanently changing the aerodynamic characteristics of the latter.

Figure 5:
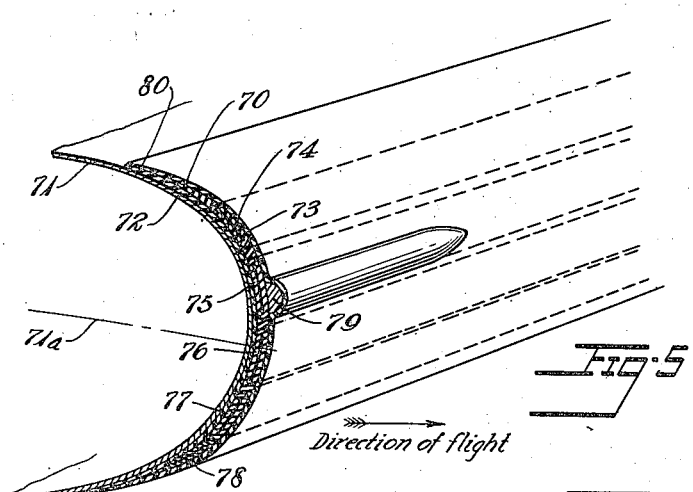

The modified construction of the shoe structure illustrated in Fig. 5 is suitable especially for use with airplane wings which are thin in section; hence a protective covering or shoe structure 70 of relatively small size may be provided. A foundation layer 72 of flexible material and a covering layer 73 of rubber-like material, which is superimposed upon a plurality of inflatable tubes 74 to 78 and a permanently protuberant element 79, cover the leading edge of the wing and have their upper 80 and lower margins secured, preferably in a state of tension, to a wing surface 71 by screws or other suitable fastening means. The small protuberant element 79, preferably semicircular in section, may be made of any suitable firm material, such as rubber or wood, and may be mounted upon the lower portion of the inflatable tube 75 in the vicinity of or at the center line 71a of the leading edge to provide for altering the aerodynamic characteristics of the airfoil and to resist ice accumulation upon the element 79.

It is preferred in the operation of the shoe structure 70 to inflate the alternate tubes 74, 76 and 78 simultaneously while the other tubes 75 and 77 are deflated; then to inflate the latter tubes similarly, while the former tubes are deflated. By virtue of the inflation of the tube 75, the element 79 is moved outwardly from the wing surface 71 and also has a rocking action. Due to the above procedure the desirable flexing and stretching of the cover 73 coincides with the aforesaid movement of the element 79, which provides effectively for the removal of ice accumulation upon the element 79 and the remainder of the shoe structure 70 by loosening and breaking up the ice thereon while providing for altering the aerodynamic characteristics of the wing.

Variations may be made without departing from the scope of the invention as it is defined in the following claims.

I claim:

1. Means for preventing the accumulation of ice upon an airfoil and maintaining a permanent protrusion beyond the normal aerodynamic surface of the airfoil for modifying the aerodynamic characteristics of said airfoil, said means comprising an extensible surface covering adapted to be mounted at the leading edge of the airfoil, a pair of inflatable portions beneath the surface of said surface covering for varying the configuration of said surface covering upon inflation, means for inflating said portions in alternation, and a permanently protuberant element superimposed upon said surface covering and movable therewith outwardly from said leading edge upon said inflation and at least partially overlying said inflatable portions whereby outwardly rocking movement occurs upon alternate inflation of said portions.

2. Means for preventing the accumulation of ice upon an airfoil and maintaining a permanent protrusion beyond the normal aerodynamic surface of the airfoil for modifying the aerodynamic characteristics of said airfoil, said means comprising an extensible surface covering adapted to be mounted at the leading edge of the airfoil, a pair of contiguous inflatable tubes beneath the surface of said surface covering to vary the configuration of said surface covering upon inflation, means for inflating said tubes in alternation, and a permanently protuberant element superimposed upon said covering and movable therewith outwardly from said leading edge upon said inflation and straddling said tubes whereby outwardly rocking movement occurs upon alternate inflation of the tubes.

3. Means for preventing the accumulation of ice upon an airfoil and permanently modifying the contour of the leading edge of the airfoil for altering the aerodynamic characteristics of said airfoil, said means comprising a shoe adapted to be mounted at the leading edge and having portions adapted to be distorted outwardly therefrom, a pair of spaced-apart inflatable elements beneath the surface of said shoe for distorting said portions, means for inflating said elements, and a permanently protuberant member in said shoe and carried thereby and disposed between said spaced-apart inflatable elements and by virtue of its proximity with said elements being subject to outward movement from the leading edge upon inflation of said elements.

4. A shoe structure adapted to be mounted at the leading edge of an airfoil, said shoe comprising a base layer of flexible material, a cover layer of stretchable rubber-like material, a pair of contiguous inflatable tubes between said layers, a permanently bulged element disposed intermediate said layers and overlying and straddling said inflatable tubes thereby being subject to rocking movement upon alternate inflation of said tubes, and an inflatable tube disposed between said cover layer and a portion of said bulged element for changing the contour of said cover layer adjacent thereto.

5. A shoe structure adapted to be mounted at the leading edge of an airfoil, said shoe comprising a base layer of flexible material, a cover layer of stretchable rubber-like material, a pair of spaced-apart inflatable tubes between said layers, a permanently protuberant element disposed intermediate said layers at the space between said tubes and by virtue of its proximity with said tubes being subject to outward movement from the leading edge upon inflation of said tubes, and an inflatable tube disposed between said cover layer and a protruding portion of said element for altering the contour of said cover layer adjacent thereto.

6. A shoe structure having a portion adapted to be mounted at the leading edge of an airfoil, said shoe comprising a base layer of flexible material, a cover layer of stretchable rubber-like material, a plurality of inflatable tubes between said layers, one of said tubes being disposed adjacent the center line of said portion, and a permanently protuberant element disposed intermediate said layers and superimposed upon such center line tube thereby being subject to outward movement from the leading edge upon inflation of the latter said tube.

7. Means for preventing the accumulation of ice upon an airfoil and maintaining a permanent local protrusion beyond the normal aerodynamic surface of the airfoil for modifying the aerodynamic characteristics of said airfoil, said means comprising a shoe structure adapted to be mounted at the leading edge of said airfoil and having a portion adapted to be distorted outwardly from said aerodynamic surface, a permanently protuberant member of elongated form extending along said shoe structure and superimposed upon the distortable portion and movable outwardly therewith, said protuberant member comprising distortable covering material in continuation of said shoe structure and a stiffening reinforcement within said covering material resisting deformation of said protuberant member while permitting the outward movement of said member, and inflatable means disposed beneath the surface of said shoe structure at said distortable portion for varying the contour of said shoe structure and imparting the outward movement to said protuberant member.

8. Means for preventing the accumulation of ice upon an airfoil and maintaining a permanent local protrusion beyond the normal aerodynamic surface of the airfoil for modifying the aerodynamic characteristics of said airfoil, said means comprising a shoe structure adapted to be mounted at the leading edge of said airfoil and having a portion adapted to be moved with respect to said aerodynamic surface, a permanently protuberant element of elongated form extending along said shoe structure and superimposed upon said portion and movable therewith, said protuberant element comprising covering material in continuation of said shoe structure and a stiffening reinforcement within said covering material resisting deformation of said protuberant element while permitting the movement of said element, and inflatable means disposed beneath the surface of said shoe structure at said portion for varying the contour of said shoe structure and imparting the movement to said protuberant element.

9. Means for preventing the accumulation of ice upon a body in the air and permanently modifying the contour of the frontal area of said body, said means comprising a deformable surface at said frontal area, means for varying the configuration of said surface and for moving a portion of said surface outwardly from said body, and a permanently protuberant element of elongated form extending along said surface at said frontal area and movable outwardly with said portion, said protuberant element comprising deformable covering material in continuation of said deformable surface and a stiffening reinforcement within said covering material resisting deformation of said element while permitting the outward movement of said element.

10. Means for preventing the accumulation of ice upon a body in the air and permanently modifying the contour of the frontal area of said body, said means comprising a deformable surface at said frontal area, means for varying the configuration of said surface and for moving a portion of said surface outwardly from said body, and a permanently protuberant element of elongated and rounded form extending along said surface at said frontal area and movable outwardly with said portion of the deformable surface, said protuberant element comprising deformable covering material in continuation of said deformable surface and a stiffening reinforcement within said covering material resisting deformation of said element while permitting the outward movement of said element.

11. Means for preventing the accumulation of ice upon a body in the air and permanently modifying the contour of the exposed surface, said means comprising a deformable surface, means for altering the configuration of said surface by movement thereof outwardly from said body, and a permanently protuberant element of elongated form extending along said surface and superimposed upon the deformable surface and movable outwardly therewith, said protuberant element comprising deformable covering material in continuation of said deformable surface and a stiffening reinforcement within said covering material resisting deformation of said element while permitting the outward movement of said element.

12. Means for preventing the accumulation of ice upon a body in the air and permanently modifying the contour of the exposed surface, said means comprising a deformable surface, inflatable means for altering the configuration of said surface by movement thereof outwardly from said body, and a permanently protuberant element of elongated form extending along said surface and superimposed upon the deformable surface and movable outwardly therewith, said protuberant element comprising deformable covering material in continuation of said deformable surface and a stiffening reinforcement within said covering material resisting deformation of said element while permitting the outward movement of said element.

13. Means for preventing the accumulation of ice upon a body in the air and permanently modifying the contour of the exposed surface, said means comprising a deformable surface, a permanently protuberant element at said deformable surface, said element comprising deformable covering material in continuation of said deformable surface having a distortable surface portion adapted to prevent the accumulation of ice thereon and comprising a stiffening reinforcement within said covering material resisting deformation of said element, means for changing the contour of said deformable surface, and means for changing the contour of said distortable portion.

14. Means for preventing the accumulation of ice upon a body in the air and permanently modifying the contour of the exposed surface, said means comprising a deformable surface, a permanently protuberant member at and movable with said deformable surface, said member comprising deformable covering material in continuation of said deformable surface having a distortable surface portion adapted to prevent the accumulation of ice thereon and comprising a stiffening reinforcement within said covering material resisting deformation of said member, means for changing the contour of said deformable surface, and means for changing the contour of said distortable portion.

15. Means for preventing the accumulation of ice upon an airfoil and maintaining a permanent local protrusion beyond the normal aerodynamic surface of the airfoil for modifying the aerodynamic characteristics of said airfoil, said means comprising a shoe structure for mounting over the leading edge of the airfoil including a permanently protruding portion of elongated form extending along said shoe and carried thereby, and inflatable means in said shoe in the vicinity of said protruding portion for distorting the surface of the shoe and moving said protruding portion outwardly from said leading edge intermittently, said protruding portion comprising a stiffening reinforcement resisting deformation of the shape of said protruding portion while permitting the outward movement of said protruding portion.

16. Protective means for preventing the accumulation of ice upon an airfoil and permanently modifying the contour of the leading edge of the airfoil for altering the aerodynamic characteristics of said airfoil, said means comprising an extensible sheath for mounting over the leading edge and including beneath the surface of said sheath and carried thereby a permanently bulged element of elongated form for disposition at said leading edge, and inflatable means for varying the configuration of said sheath and for varying the configuration of the surface of said bulged element and for moving the bulged element outwardly with respect to the leading edge upon intermittent inflation of said inflatable means.

THOMAS C. HARPER.

REFERENCES CITED

The following references are of record in the file of this patent:

UNITED STATES PATENTS

| Number | Name | Date |
|---|---|---|
| 2,168,328 | Diehl | Aug. 8, 1939 |
| 2,271,466 | Schmidt | Jan. 27, 1942 |
| 2,271,760 | Colley | Feb. 3, 1942 |
| 1,942,867 | Leguillon | Jan. 9, 1934 |
| 2,168,008 | Taylor | Aug. 1, 1939 |
| 2,173,262 | Monegan et al. | Sept. 19, 1939 |
| 2,375,146 | Taylor | May 1, 1945 |